United States Patent
Brobston et al.

(10) Patent No.: US 7,031,409 B2
(45) Date of Patent: Apr. 18, 2006

(54) FULLY DIGITAL AGC CIRCUIT WITH WIDE DYNAMIC RANGE AND METHOD OF OPERATION

(75) Inventors: Michael L. Brobston, Allen, TX (US); Jason Rock, Dallas, TX (US); Weon-Ki Yoon, Plano, TX (US); Min Jeon, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 756 days.

(21) Appl. No.: 10/226,417

(22) Filed: Aug. 23, 2002

(65) Prior Publication Data

US 2004/0037377 A1    Feb. 26, 2004

(51) Int. Cl.
    *H04L 27/08* (2006.01)
(52) U.S. Cl. ................. 375/345; 455/234.1; 455/240.1
(58) Field of Classification Search ............... 375/345; 455/232.1, 234.1, 234.2, 239.1, 240.1, 242.1, 455/245.1, 136, 127.2
    See application file for complete search history.

(56) References Cited

U.S. PATENT DOCUMENTS

| | | | |
|---|---|---|---|
| 5,764,689 A | 6/1998 | Walley | 375/206 |
| 6,249,554 B1 | 6/2001 | Mobin et al. | 375/345 |
| 6,275,259 B1 | 8/2001 | Gowda et al. | 348/229 |
| 6,553,084 B1* | 4/2003 | Maru | 375/345 |
| 6,843,597 B1* | 1/2005 | Li et al. | 375/345 |
| 6,868,263 B1* | 3/2005 | Filipovic | 455/245.1 |
| 2003/0148745 A1* | 8/2003 | Nystrom et al. | 455/136 |
| 2003/0207675 A1* | 11/2003 | Hughes et al. | 455/234.1 |
| 2004/0014441 A1* | 1/2004 | Piirainen et al. | 455/127.1 |

\* cited by examiner

*Primary Examiner*—Phuong Phu

(57) ABSTRACT

A digital automatic gain control (AGC) circuit for use in a radio frequency (RF) receiver. The AGC circuit comprises: 1) a first shifter for receiving an in-phase signal as a first series of X-bit samples and left-shifting each X-bit sample by a number of bits determined by a coarse scaling factor; 2) a first limiter for receiving the D most significant bits of the output of the first shifter and outputting a subset of the D most significant bits of the first shifter output; 3) a first multiplier for multiplying the subset of the D most significant bits of the first shifter output by a fine scaling factor to produce a first M-bit product; and 4) a gain adjustment circuit for comparing a power signal derived from the first M-bit product to a maximum threshold value and generating the coarse scaling factor and the fine scaling factor.

24 Claims, 3 Drawing Sheets

FULLY DIGITAL AGC CIRCUIT WITH WIDE DYNAMIC RANGE AND METHOD OF OPERATION

TECHNICAL FIELD OF THE INVENTION

The present invention is directed, in general, to radio frequency (RF) receivers and, more specifically, to an all-digital automatic gain control (AGC) circuit for use in the receiver of a wireless network base station or the receiver of a wireless access terminal.

BACKGROUND OF THE INVENTION

Conventional automatic gain control (AGC) circuits are analog circuits consisting of variable gain amplifiers and/or attenuators driven by a signal level detection circuit and an integrator circuit. The accuracy of an analog AGC circuit is often acceptable over a narrow dynamic range, but is often less than desirable over a wide dynamic range. Additionally, the dynamic range of analog AGC circuit is often limited by stability. Analog AGC loops also exhibit poor accuracy, poor temperature variation characteristics, wide variations with device characteristics, sensitivity to signal modulation characteristics, sensitivity to signal crest factor, sensitivity to the number of received carriers, and limited capability for programmable time constant.

The classical analog AGC circuit in a feed-forward configuration is normally implemented using a variable gain or attenuation stage followed by a detector circuit. The detector provides a signal proportional to the analog signal level. This signal is compared to a fixed analog threshold voltage in either a comparator or a difference amplifier. The output of the comparator or difference amplifier is integrated using a time constant that is set according to the expected received signal characteristics. The integrator output is used to control the gain of the variable gain (or attenuation) stage. This closed loop tries to adjust the gain so that the detected signal level is maintained constant relative to the fixed threshold level. The operation of these textbook circuits is well documented and understood.

In recent implementations of AGC circuits, some of these AGC functional blocks have been implemented using digital circuitry. However, digital receivers are often required to process signals received over a wide range of intensities, while the digital demodulator circuits within digital receivers perform optimally only over a relatively narrow range of signal intensities. It is desirable to use a digital automatic gain control circuit to adjust the amount of gain prior to the demodulator circuit inversely with the received signal level such that the demodulator receives a relatively constant and optimal signal level.

A fully digital AGC circuit has a number of advantages. A fully digital AGC circuit provides very fine level control accuracy over an extremely wide dynamic range, programmable threshold control with very fine resolution, programmable time constant, high circuit stability, immunity to device temperature variations, immunity to device-to-device variations, insensitivity to signal modulation characteristics, and insensitivity to signal crest factor variations.

However, full digital AGC implementations have proved difficult due to the need to replace the variable gain analog element with a wide-bit multiplier in the digital AGC circuits. For example, a wide dynamic range digital representation of the received signal may consist of 48 bits of data: 24 bits of in-phase (I) data and 24 bits of quadrature (Q) data. In order to adjust the gain of the quadrature 24-bit samples down to, for example, a 4-bit range without any loss of phase information would require two 24 by 20-bit multiplications in the digital circuitry. The number of logic cells required to perform a multiplication of this magnitude would be prohibitively large. Thousands of logic cells would be required to perform this multiplication.

Some full or partial digital implementations of an AGC circuit have been documented in patent filings. U.S. Pat. No. 6,249,554 describes a digital AGC circuit that uses a digital multiplier for the gain scaling stage. However, in order to use this implementation for wide dynamic range signals having in excess of 16 bits of data width, very large digital multiplier stages must be implemented to perform the necessary multiplication. Also, the digital AGC circuit in U.S. Pat. No. 6,249,554 relies on a power estimation based only on the square of the I samples rather than vector magnitude estimation of the I and Q samples.

The digital AGC in U.S. Pat. No. 6,249,554 relies on the implementation of direct digital multipliers. In high dynamic range applications, such as mobile wireless, where the input data samples are wide bit samples, such as 16 to 24 bits, the size of the required multipliers is very large—on the order of thousands of logic cells. This size requirement limits the usefulness of this method for mobile wireless applications due to the high cost associated with dedicating a large quantity of logic cells to perform this function. This AGC implementation also relies solely on an I sample power calculation for detection of signal level instead of determining the vector magnitude. This limits the usefulness of the detector to the post-synchronization stages of the receiver where there would be a fixed ratio between the I and Q samples.

In many digital receiver architectures, it is advantageous for the synchronization stages to follow the AGC stage. In these applications, the AGC circuit must operate based on a estimate or calculation of the vector magnitude of the signal samples. This algorithm would not be useful for these applications since it would cause gain control errors.

U.S. Pat. No. 5,764,689 describes a digital AGC circuit based on a digital implementation of the detector and the integration functions of the AGC loop. The gain control signal is generated digitally and is converted to an analog control using a digital-to-analog converter, but the actual variable gain element is an analog amplifier. The digital AGC in U.S. Pat. No. 5,764,689 provides only six gain control states to an analog variable gain element. For a wide dynamic range AGC function supporting digital demodulation, this would not provide adequate signal level range or accuracy on the output of the AGC loop.

U.S. Pat. No. 6,275,259 describes a digital AGC circuit which is partially an analog loop in that the gain control signal is an analog signal. This analog signal is used as the reference voltage for an analog-to-digital converter (ADC), which in effect uses the converter as the variable gain element in the AGC loop. The digital AGC in U.S. Pat. No. 6,275,259 is designed for purely scalar signals and has no capability to process quadrature signals as would be required in the a digital communication receiver.

Therefore, there is a need in the art for improved all-digital radio frequency (RF) receivers. In particular, there is a need for an improved all-digital automatic gain control (AGC) circuit for use in RF receivers in wireless network applications.

SUMMARY OF THE INVENTION

The present invention provides an automatic gain control (AGC) circuit implemented entirely in digital circuitry that greatly minimizes the processing elements required. The present invention is optimized for implementation in a field programmable gate array device (FPGA) and is intended for use in a digital radio receiver for the purpose of compressing the wide dynamic range of a digitized received signal into a relatively small dynamic range prior to being provided to a digital demodulator.

According to an exemplary embodiment, the present invention algorithm accepts 24-bit 2 s-complement quadrature data and compresses the data into 4-bit 2 s-complement quadrature data. Suitable applications for the present invention include digital radio receivers used in mobile wireless infrastructure products, mobile wireless terminal products, and fixed wireless point-to-point and point-to-multi-point products. The present invention provides excellent performance and optimizes demodulator response for any digital modulation type, including quadrature phase shift keying (QPSK) and quadrature amplitude modulation (QAM).

The present invention implements a fully digital AGC circuit that provides all of the advantages described above, without requiring an extremely large multiplier function. This is accomplished by performing the scaling in three smaller stages: a shift stage, a limiter stage, and a small multiplier stage. The quantity of logic cells required to perform these function is easily supported by conventional field programmable gate array (FPGA) sizes. An advantageous embodiment of the present invention may require only approximately 550 FPGA logic cells for full implementation of the 24-bit to 4-bit compression of quadrature data samples. With current 0.18 micron ($\mu m$) CMOS device technology providing common densities of between 5,000 to 70,000 logic cells within a single FPGA or ASIC, a fully digital AGC block may be implemented using a relatively small percentage of the device assets.

To address the above-discussed deficiencies of the prior art, it is a primary object of the present invention to provide a digital automatic gain control (AGC) circuit for use in a radio frequency (RF) receiver. According to an advantageous embodiment, the digital automatic gain control (AGC) circuit comprises: 1) a first shifter capable of receiving an in-phase signal as a first series of X-bit samples and left-shifting each X-bit sample by a number of bits determined by a coarse scaling factor; 2) a first limiter capable of receiving the D most significant bits of the output of the first shifter and outputting a subset of the D most significant bits of the first shifter output; 3) a first multiplier capable of multiplying the subset of the D most significant bits of the first shifter output by a fine scaling factor to produce a first M-bit product; and 4) a gain adjustment circuit capable of comparing a power signal derived from the first M-bit product to a maximum threshold value and generating the coarse scaling factor and the fine scaling factor.

According to one embodiment of the present invention, the digital AGC circuit further comprises a first rounder for rounding the first M-bit product to a Y-bit in-phase output.

According to another embodiment of the present invention, the gain adjustment circuit comprises a first squaring circuit for squaring the first M-bit product to thereby produce the power signal.

According to still another embodiment of the present invention, the gain adjustment circuit comprises a comparator for comparing the power signal to a maximum threshold and outputting a comparison result value, wherein the comparison result value is equal to +1 if the power signal is less than the maximum threshold, is equal to −1 if the power signal is greater than the maximum threshold, and is equal to 0 if the power signal is equal to the maximum threshold.

According to yet another embodiment of the present invention, the gain adjustment circuit further comprises an integrator that receives the comparison result value from the comparator and generates a C-bit output.

According to a further embodiment of the present invention, the integrator increments the C-bit output whenever the comparison result value from the comparator is equal to +1.

According to a still further embodiment of the present invention, the integrator decrements the C-bit output whenever the comparison result value from the comparator is equal to −1.

According to a yet further embodiment of the present invention, the N least significant bits of the C-bit output of the integrator comprise the fine scaling factor and the R most significant bits of the C-bit output of the integrator comprise the coarse scaling factor.

In one embodiment of the present invention, the digital AGC circuit further comprises: 5) a second shifter capable of receiving a quadrature signal as a second series of X-bit samples and left-shifting each X-bit sample by a number of bits determined by the coarse scaling factor; 6) a second limiter capable of receiving the D most significant bits of the output of the second shifter and outputting a subset of the D most significant bits of the second shifter output; and 7) a second multiplier capable of multiplying the subset of the D most significant bits of the second shifter output by the fine scaling factor to produce a second M-bit product, wherein the power signal is derived from the first and second M-bit products.

In another embodiment of the present invention, the gain adjustment circuit comprises a first squaring circuit for squaring the first M-bit product, a second squaring circuit for squaring the second M-bit product, and a summer for adding outputs of the first and second squaring circuits to thereby produce the power signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
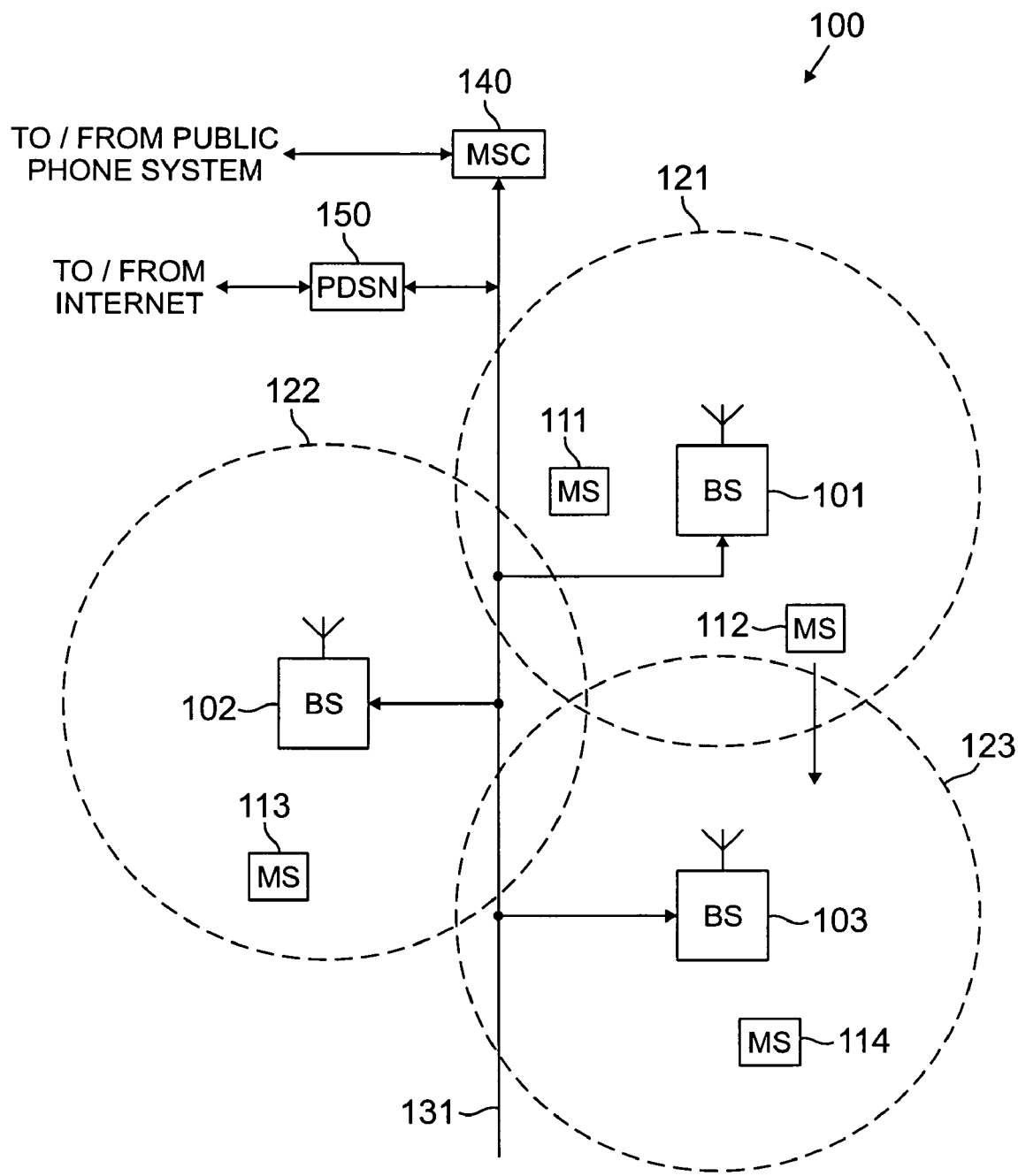
FIG. 1 illustrates an exemplary wireless network according to one embodiment of the present invention.
Figure 2:
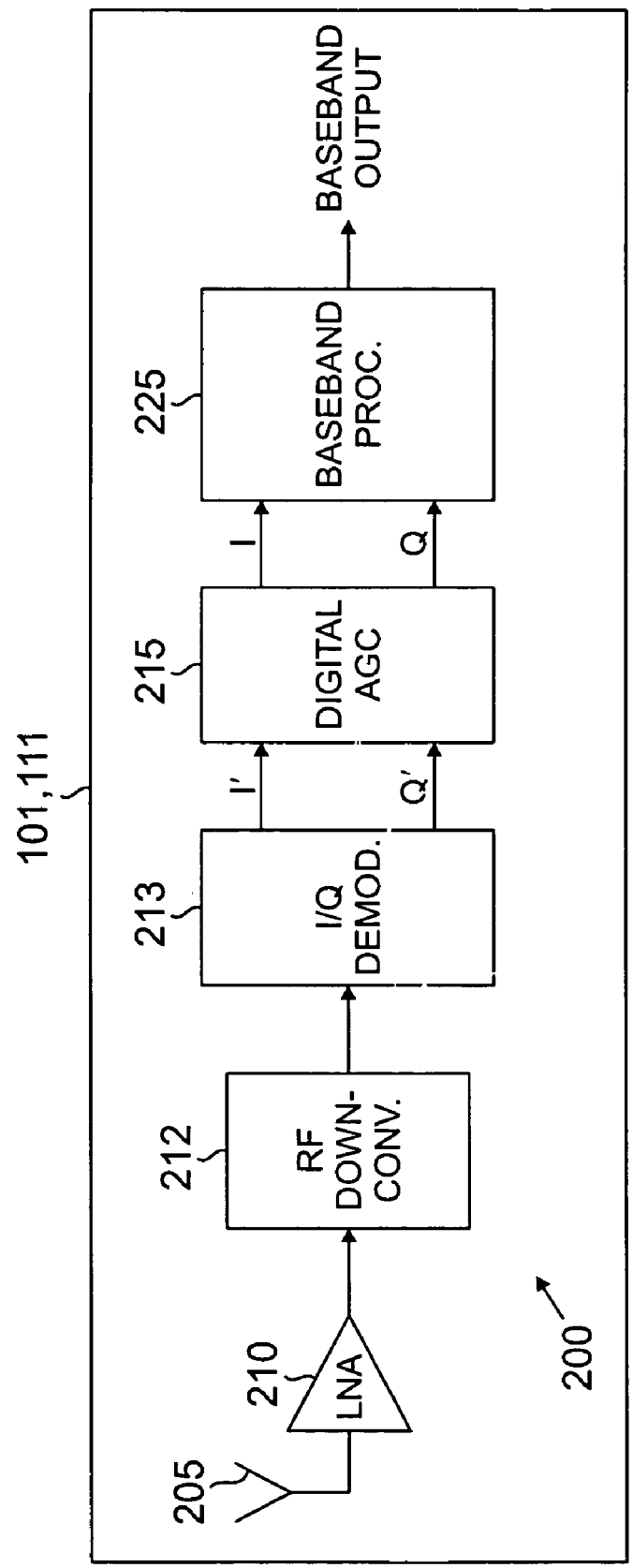
FIG. 2 is a high-level block diagram of a wireless receiver according to one embodiment of the present invention.
Figure 3:
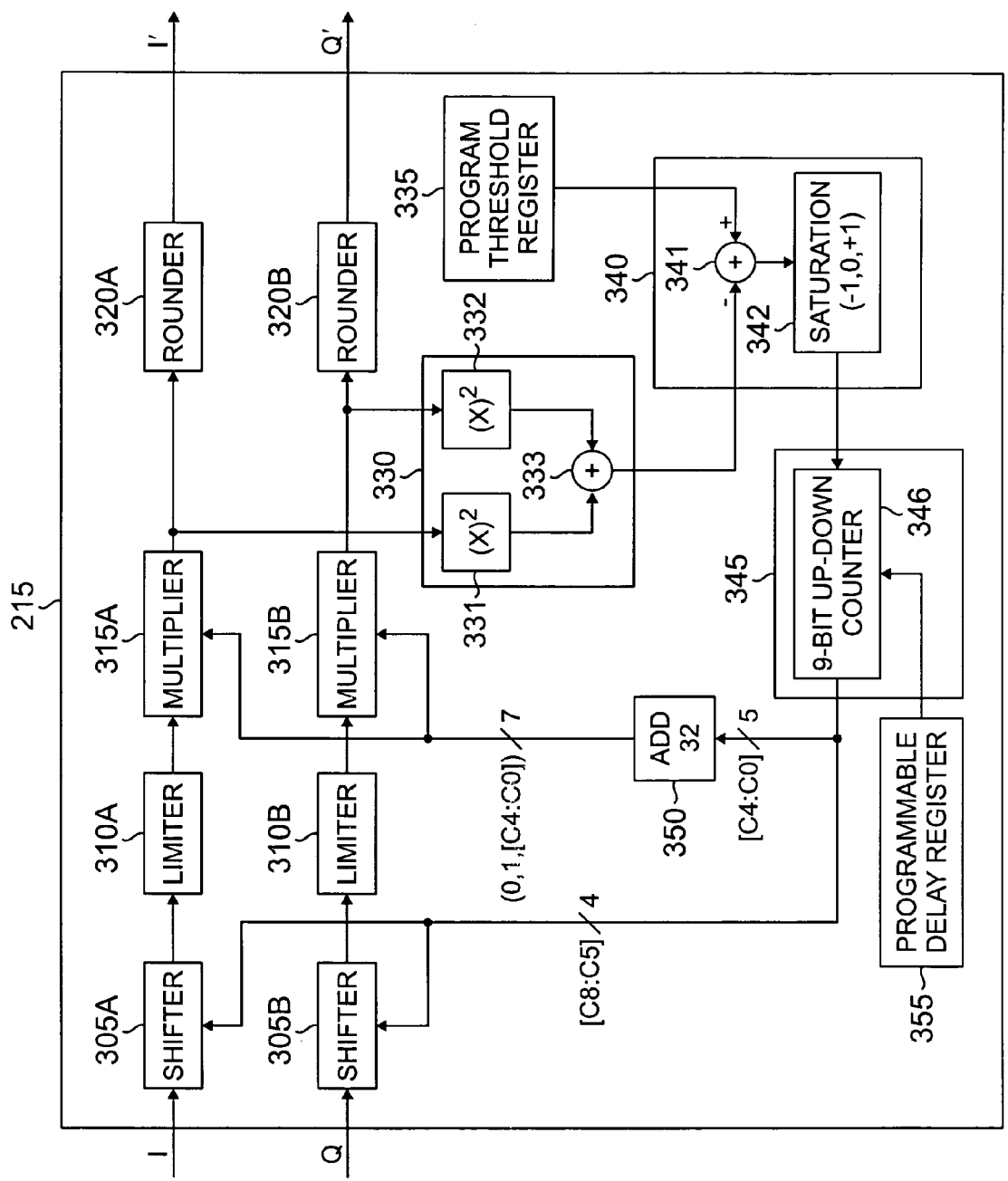
FIG. 3 is a detailed block diagram of an all-digital automatic gain control (AGC) circuit according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 communicate with a plurality of mobile stations (MS) 111–114 over, for example, code division multiple access (CDMA) channels. Mobile stations 111–114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121–123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center MSC) 140. BS 101, BS 102 and BS 103 also transfer data signals, such as packet data, with the Internet (not shown) via communication line 131 and packet data serving node (PDSN) 150. Line 131 also provides the connection path to transfers control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is a hand-off of a mobile station, between cells sites, that is communicating in the control or paging channel.

FIG. 2 is a high-level block diagram of wireless receiver 200 according to one embodiment of the present invention. Wireless receiver 200 is intended to represent a generic quadrature receiver suitable for use in, for example, base station 101 or mobile station 111. Wireless receiver 200 comprises antenna 205, low-noise amplifier (LNA) 210, radio frequency (RF) down-converter 212, I/Q demodulation block 213, digital automatic gain control (AGC) circuit 215, and baseband processing block 225.

LNA 210 amplifies a received RF signal picked up by antenna 205 and amplifies the received RF signal to a suitable level. Next, the amplified RF signal is down-converted to an intermediate frequency (IF) signal by RF down-converter 212 and is then digitized. The digitized intermediate frequency signal is demodulated by I/Q demodulation block 213 to produce I and Q output signals.

The digitized I and Q output signals comprise a series of in-phase (I) symbol samples and a series of quadrature (Q) symbol samples. Next, digital AGC circuit 215 compresses the I samples and the Q samples from, for example, 24-bit samples, down to, for example, 4-bit I' and Q' samples. The compressed I' and Q' output signals are further processed by baseband processing block 225 to form the final baseband output signal.

In accordance with the principles of the present invention, digital AGC circuit 215 provides a simplified digital circuit that greatly minimizes the processing elements required. Digital AGC circuit 215 is optimized for implementation in a field programmable gate array device (FPGA) and is particularly suitable for use in a digital radio receiver.

FIG. 3 is a detailed block diagram of all-digital automatic gain control (AGC) circuit 215 according to one embodiment of the present invention. Digital AGC circuit 215 has an in-phase signal path comprising shifter 305A, limiter 310A, multiplier 315A, and rounder 320A. Digital AGC circuit 215 also has a quadrature signal path comprising shifter 305B, limiter 310B, multiplier 315B, and rounder 320B. Digital AGC circuit 215 also comprises power detector 330, programmable threshold register 335, comparator 340, integrator 345, +32 adder 350, and programmable delay register 355. Power detector 330 comprises squaring circuit 331, squaring circuit 332, and summer 333. Comparator 340 contains summer 341 and saturation circuit 342. Integrator 345 contains 9-bit up-down counter 346.

Equivalent operations occur on the I and Q paths, so the operation of the I path will be discussed and shall apply to the operation of the Q path as well. Shifter 305A comprises a 32-bit shift register that receives a 24-bit sample, [X23:X0], and left-shifts the sample between 0 and 15 places to perform an initial multiplication of $2^C$, where C is the integer shift value between 0 and 15. The sample [X23:X0] is a 2 s complement number.

Shifting the [X23:X0] sample by C moves the leading binary 0 value into the uppermost bit positions. Binary 0 values are shifted into the lower bit positions. Shifter 305A is controlled by a four-bit value, [C8:C5], from integrator 345. If the shift, C, is 0 (i.e., [C8:C5] is [0000]), then [X23:X0] fills [D32:D1] of shifter 305A so that [D3:D1] are 000, [X22:X0] fill [D26:D4], respectively, and X23 fills each of [D32:D27].

Shifter 305A has a 13-bit output, namely [D32:D20], which is in 2 s complement format. Limiter 310A limits the 13-bit output of shifter 305A to 7 bits, namely [D26:D20], which also is a 2 s complement number. Multiplier 315A is a 7-bit by 7-bit 2 s complement multiplier. Multiplier 315A produces a 12-bit 2 s complement product value, [M12:M1]. The output of multiplier 315A is the 5 most significant bits, [M12:M8]. Rounder 320A rounds off the 5-bit values from multiplier 315A to output a 4-bit 2 s complement value, [Y4:Y1].

As noted above, the quadrature signal path is similar to the in-phase signal path, so shifter 305B, limiter 310B, multiplier 315B, and rounder 320B operate in a similar manner.

The 5-bit outputs, [M12:M8], of multipliers 315A and 315B are also provided to power detector 330, which calculates the $I^2+Q^2$ value for each data sample. The output of power detector 330 provides a linear representation of the received signal power for each signal sample period. The vector magnitude value from power detector 330 is provided to comparator 340, which consists of summer 341 and saturation block 342. The vector magnitude is subtracted in summer 341 from a threshold value stored in programmable threshold register 335. This allows the AGC threshold to be programmable over a wide range of integer values from 1 to 512 in order to set the output level to whatever value is optimal for baseband processing block 225. The output of summer 341 is provided to saturation block, which outputs one of three values: −1, 0, or +1.

The three-value output of comparator 340 is then provided to integrator 345. Integrator 345 comprises 9-bit up-down counter 346, which is controlled by a variable delay determined by programmable delay register 355. The delay value is set by programmable delay register 355 to provide delay options from 4 to 1024 samples. This provides the capability to control the response time of the loop. The output of integrator 345 is a 9-bit value, [C8:C0], that represents the multiplication factor needed to scale the 24-bit input data value down to a 4-bit value. The four (4) most significant bits (MSBs), [C8:C5], of the multiplication factor control the amount of shift introduced by shifters 305A and 305B. The five least significant bits (LSBs), [C4:C0], are added to the binary value 0100000 (i.e., 32 decimal) by +32 adder 350 and used as a multiplication factor by multipliers 315A and 315B.

The following example of the operation of the present invention is based on a compression of 24-bit data samples into 4-bit data samples. The notations $X_x$, $C_x$, $D_x$, $M_x$ and $Y_x$ have the binary values 1 or 0. The operation of the present invention may be described in greater detail as follows:

1) The inputs to digital AGC circuit 215 are 24-bit, 2 s complement I and Q baseband data samples, which arrive at intervals equal to the system clock (CLK) rate. The input baseband data are represented by the binary data array [$X_{23}$ $X_{22}$ . . . $X_0$].

2) Shifters 305A and 305B—The 24-bit input sample array [$X_{23}$ $X_{22}$ . . . $X_0$] is shifted up (i.e., left-shifted) by the control bits [$C_8$ $C_7$ $C_6$ $C_5$], which are unsigned binary codes. With a four bit binary code the shift control can be set to any integer from 0 to 15. This shift operation does the initial coarse scaling (i.e., coarse adjustment) of the input data to provide compression of the signal range from a 24 bit range to a 13-bit range. The 13-bit output array [$D_{32}$ $D_{31}$ ... $D_{20}$] is chosen from the output of shifters 305A and 305B.

The input and output codes of shifters 305A and 305B are 2 s complement binary code where the MSB (Most Significant Bit) is the sign bit. The bit $D_{32}$ is always set equal to $X_{23}$ to provide sign extension to the shifted sample. The MSB of the shifter output must be the same as MSB of the input to keep the same sign value. When the first control bits ($C_8$ $C_7$ $C_6$ $C_5$) are equal to (0 0 0 0), then the 13-bit output array [$D_{32}$ $D_{31}$ ... $D_{20}$] is equal to [$X_{23}$ $X_{23}$ $X_{23}$ $X_{23}$ $X_{23}$ $X_{23}$ $X_{22}$ ... $X_{16}$]. As the first control bits are increased by 1, the input X bits are shifted up by 1 bit and the output array ($D_{32}$ $D_{31}$ ... $D_{20}$) is equal to the input bits ($X_{23}$ $X_{23}$ $X_{23}$ $X_{23}$ $X_{23}$ $X_{22}$ ... $X_{16}$ $X_{15}$). When the control bits are the maximum value (1 1 1 1), the output array [$D_{32}$ $D_{31}$ ... $D_{20}$] is equal to the input bits [$X_{23}$ $X_{12}$ ... $X_2$ $X_1$].

3) Limiters 310A and 310B—Limiters 310A and 310B reduce the 13-bit 2 s complement data array from shifters 305A and 305B down to a 7-bit 2 s complement output array. When the input data array exceeds the values of +63 or −64 decimal, which represent the maximum positive and negative numbers of a 7-bit binary code, then the output of the limiter is set to the value of +63 or −64, respectively.

4) Multipliers 315A and 315B—Each one of multipliers 315A and 315B multiples two 7-bit 2 s complement input arrays to produce one 13-bit 2 s complement output array [$M_{12}$ $M_{11}$ ... $M_0$]. Only the upper 5 bits, [$M_{12}$ $M_{11}$ $M_{10}$ $M_9$ $M_8$], of the product are needed for the digital AGC process. Multipliers 315A and 315B perform the fine scaling (fine adjustment) of the digital samples.

5) Rounders 320A and 320B—Rounders 320A and 320B operate on the 5-bit 2 s complement outputs of multiplier 315A and 315B to generate rounded results I' and Q'. Each of rounders 320A and 320B rounds the 5-bit array value to a 4-bit value. Initially, rounders 320A and 320B limit the maximum positive value to +14 decimal, adds a value of +1 to every sample, and then eliminates the LSB of the array. This makes the output of the loop a 4-bit 2 s complement value whose range is from −8 to +7 decimal. The 4-bit rounders round off the 5-bit 2 s complement input, [$M_{12}$ $M_{11}$ $M_{10}$ $M_9$ $M_8$] to a 4-bit 2 s complement output, [$Y_4$ $Y_3$ $Y_2$ $Y_1$].

6) Power Detector 330—Power detector 330 calculates the real power magnitude of each multiplier sample. This is done by performing a square operation on each scaled I and Q sample using squaring circuits 331 and 332 to convert from a voltage magnitude representation to a power representation. The 9-bit $I^2$ and $Q^2$ values produced are then summed to produce a 10-bit unsigned binary value that represents the sample vector power. Rather than performing a 5-bit by 5-bit multiplication, the squaring function performs the operation using a simplified set of logic equations, as described below.

For a 5-bit input array, [b4 b3 b2 b1 b0], the functional block calculates the mathematical square array [u8 u7 u6 u5 u4 u3 u2 u1 u0], using the following logic equations:

$u8 = b4 \times b3^* \times b2^* \times b1^* \times b0^*$;

$u7 = [b4^* \times b3 \times b2] + [b4 \times b3^* \times b2 \times b1^* \times b0^*] +$
$\quad [b4 \times b3^* \times b2^* \times b0] + [b4 \times b3^* \times b2^* \times b1]$;

$u6 = [b4^* \times b3 \times b1] + [b4^* \times b3 \times b2^*] +$
$\quad [b3 \times b2^* \times b1^* \times b0^*] + [b4 \times \text{not } b3^* \times b1^* \times b0] +$
$\quad [b4 \times b3^* \times b2 \times b1] + [b4 \times b3^* \times b1 \times b0^*]$;

$u5 = [b4^* \times b3^* \times b2 \times b1] + [b4^* \times b3 \times b2 \times b0] +$
$\quad [b4^* \times b3 \times b2^* \times b1] + [b3 \times b2^* \times b1 \times b0^*] +$
$\quad [b4 \times b3 \times b2^* \times b1^* \times b0] + [b4 \times b3^* \times b1^* \times b0] +$
$\quad [b4 \times b3^* \times b2^* \times b0] + [b4 \times b3^* \times b2 \times b1 \times b0^*]$;

$u4 = [b4 \times b2 \times b1^* \times b0^*] + [b4 \times b3^* \times b2 \times b0] +$
$\quad [b3 \times b2^* \times b0] + [b4^* \times b2 \times b1^* \times b0^*] +$
$\quad [b4^* \times b3^* \times b2 \times b0]$;

$u3 = [b4^* \times b2 \times b1^* \times b0] + [b3 \times b2^* \times b1 \times b0] +$
$\quad [b4 \times b2 \times b1^* \times b0] + [b3^* \times b2^* \times b1 \times b0]$;

$u2 = b1 \times b0^*$;

$u1 = 0$;

$u0 = b0$;

where "x" denotes the AND operator, "+" denotes the OR operator, and "*" denotes the NOT operator.

7) Comparator 340—The 10-bit vector power samples are then supplied to comparator 340. Comparator 340 performs a comparison between each vector power sample and a maximum threshold value stored in programmable threshold register 335, which can be set to values from 1 to 512 decimal. The comparison comprises the steps of subtracting the vector power sample from the threshold value and then limiting the output of summer 341 to three values. If the vector sample is greater than the maximum threshold value, summer 341 output is negative and the limited output value is set to −1 by saturation circuit 342. If the vector sample is less than the threshold, summer 341 output is positive and the limited output value is set to +1. If the vector sample is equal to the threshold, summer 341 output is zero.

8) Integrator 345—Integrator 345 consists of a 9-bit up-down counter 345. The 9-bit up-down counter 345 consists of 9-bit register used as an accumulator and an adder. The adder adds the output value of the 9-bit accumulator register with the output (−1, 0, or 1) from comparator 340 and then the addition result is accumulated back into the 9-bit register at a rate equal to the CLK rate divided by the delay value stored in programmable delay register 355. If the output of the adder is larger than +511 or smaller than 0 decimal, which represents the maximum and minimum numbers of a 9-bit unsigned binary code, then the output of the adder is set to the value of +511 or 0, respectively.

The delay value in programmable delay register 355 can be set to any integer value from 4 to 1024. The tracking time of the loop in digital AGC circuit 215 depends on the delay value. Every delay interval, the output of 9-bit up-down counter 346 is updated by the amount of the input value, −1, 0, or 1, from comparator 340. The upper four (4) bits of the integrator 345 output vector, [$C_8$ $C_7$ $C_6$ $C_5$], are used to control shifters 305A and 305B to perform the initial coarse scaling of the input data samples, [X23:X0]. The lower five (5) bits of the integrator 345 output vector, [$C_4$ $C_3$ $C_2$ $C_1$ $C_0$], are summed with the binary value (0 1 0 0 0 0 0) and the sum is used by multipliers 315A and 315B to perform fine scaling on the data samples, [X23:X0].

The loop operates by comparing the vector power calculated from the scaled quadrature samples against the maximum threshold value. Comparator 340 issues either a value of −1, 0, or 1 for each sample. When the vector power sample is greater than the threshold, a −1 is issued, and when the vector power sample is less than the threshold, a +1 is issued. Integrator 345 essentially keeps a running average of the output of comparator 340. If comparator 340 is issuing an equal number of −1 and +1 values, then the output of integrator 345 remains constant and the scaling factor sent to shifters 305A and 305B and multipliers 310A and 310B remain constant also.

If the scaling factor is too low, then the vector power samples are, on average, less than the maximum threshold value. In this case, comparator 340 issues a greater number of +1 values than −1 values. This causes integrator 345 to begin increasing the magnitude of the scaling factor $[C_8:C_0]$. This, in turn, increases the gain applied to the signal samples. Integrator 345 continues to increase the scaling factor until the detected vector power increases to the point that comparator 340 issues equal numbers of −1 and +1 values. At that point, the control loop reaches equilibrium and the scaling factor remains constant.

Conversely, if the scaling factor is too high, then the vector power samples are, on average, greater than the maximum threshold value. In this case, comparator 340 issues a greater number of −1 values than +1 values. This causes integrator 345 to decrease the magnitude of the scaling factor, $[C_8:C_0]$. This, in turn, decreases the gain applied to the signal samples. Integrator 345 continues to decrease the scaling factor until the detected vector power decreases to the point that comparator 340 issues equal numbers of −1 and +1 values. At that point, the control loop reaches equilibrium and the scaling factor remains constant.

The rate at which integrator 345 increases or decreases the scaling factor is controlled by the value stored in programmable delay register 355. Relatively small values, such as 4, 8, or 16, cause a faster ramp rate resulting in a faster loop response time. Relatively large values, such as 512 or 1024, cause a slow ramp rate resulting in a slower loop response time.

The present invention provides very wide dynamic range operation of an AGC loop designed for quadrature digital receivers. It has virtually perfect accuracy over the full range and for various digital modulation types and crest factors. The present invention has no variations with temperature or device characteristics and offers full programmability of threshold and time constant (delay) settings. The present invention is simple and compact enough to be implemented for multiple channels within a single FPGA.

The present invention introduces a unique circuit design that avoids a very large multiplier circuit by performing a two stage scaling function consisting of coarse scaling and fine scaling operations. The coarse scaling is performed first by shifting the data prior to multiplying in order to reduce the range of data to the multiplier. After the shifter initially reduces the range, a fine scaling is performed using a small multiplier (i.e., 7×7) to achieve the required accuracy. This enables the control loop to provide excellent accuracy over an extremely wide dynamic range.

Another novel feature of the present invention is the true vector magnitude detector (i.e. power detector 330) implemented in the control loop to ensure accuracy independent of signal modulation characteristics, signal crest factor, or synchronization.

Another novel feature of the present invention is the method used in the squaring function for calculating the mathematical square of the value. The method described requires much fewer logic cells to perform the function than a standard 5-bit by 5-bit multiplier function would require.

Another novel feature is the simple integrator that uses an up/down counter function driven by a variable delay element to provide a programmable time constant. This allows the AGC loop response to be set to optimize the response time for signal variation characteristics and the demodulator response.

The present invention provides the following improvements:

1) It significantly improves signal processing performance of the digital radio receiver, which improves the performance of wireless infrastructure (i.e., base stations) and wireless terminal products (e.g., cell phone and other mobile stations).

2) It is adaptable to common wireless standards including IS-95, CDMA2000, UMTS, GSM, wireless local loop, wireless LAN, broadband wireless access, point-to-point microwave, and any other wireless system utilizing digital modulation over a wide dynamic range.

3) It enables integration of a fully digital AGC function with other digital signal processing functions into a single FPGA or ASIC device.

4) It greatly simplifies and compresses the circuitry of a critical digital receiver function.

5) It eliminates components previously required for analog AGC function, resulting in reduced product manufacturing cost.

6) It provides highly flexible software programmability.

7) It provides a key technology building block required to achieve software defined radios.

Although the present invention has been described in detail, those skilled in the art should understand that they can make various changes, substitutions and alterations herein without departing from the spirit and scope of the invention in its broadest form.

What is claimed is:

1. For use in a radio frequency (RF) receiver, a digital automatic gain control (AGC) circuit comprising:
    a first shifter capable of receiving an in-phase signal as a first series of X-bit samples and left-shifting each X-bit sample by a number of bits determined by a coarse scaling factor;
    a first limiter capable of receiving the D most significant bits of the output of the first shifter and outputting a subset of the D most significant bits of the first shifter output;
    a first multiplier capable of multiplying the subset of the D most significant bits of the first shifter output by a fine scaling factor to produce a first M-bit product; and
    a gain adjustment circuit capable of comparing a power signal derived from said first M-bit product to a maximum threshold value and generating said coarse scaling factor and said fine scaling factor.

2. The digital AGC circuit as set forth in claim 1 further comprising a first rounder for rounding said first M-bit product to a Y-bit in-phase output.

3. The digital AGC circuit as set forth in claim 1 wherein said gain adjustment circuit comprises a first squaring circuit for squaring said first M-bit product to thereby produce said power signal.

4. The digital AGC circuit as set forth in claim 3 wherein said gain adjustment circuit comprises a comparator for comparing said power signal to a maximum threshold and outputting a comparison result value, wherein said comparison result value is equal to +1 if said power signal is less than said maximum threshold, is equal to −1 if said power signal is greater than said maximum threshold, and is equal to 0 if said power signal is equal to said maximum threshold.

5. The digital AGC circuit as set forth in claim 4 wherein said gain adjustment circuit further comprises an integrator that receives said comparison result value from said comparator and generates a C-bit output.

6. The digital AGC circuit as set forth in claim 5 wherein said integrator increments said C-bit output whenever said comparison result value from said comparator is equal to +1.

7. The digital AGC circuit as set forth in claim 6 wherein said integrator decrements said C-bit output whenever said comparison result value from said comparator is equal to −1.

8. The digital AGC circuit as set forth in claim 7 wherein the N least significant bits of said C-bit output of said integrator comprise said fine scaling factor and the R most significant bits of said C-bit output of said integrator comprise said coarse scaling factor.

9. The digital AGC circuit as set forth in claim 1 further comprising:
a second shifter capable of receiving a quadrature signal as a second series of X-bit samples and left-shifting each X-bit sample by a number of bits determined by said coarse scaling factor;
a second limiter capable of receiving the D most significant bits of the output of the second shifter and outputting a subset of the D most significant bits of the second shifter output; and
a second multiplier capable of multiplying the subset of the D most significant bits of the second shifter output by said fine scaling factor to produce a second M-bit product, wherein said power signal is derived from said first and second M-bit products.

10. The digital AGC circuit as set forth in claim 9 wherein said gain adjustment circuit comprises a first squaring circuit for squaring said first M-bit product, a second squaring circuit for squaring said second M-bit product, and a summer for adding outputs of said first and second squaring circuits to thereby produce said power signal.

11. A wireless network comprising:
a plurality of base stations capable of communicating with mobile stations located in a coverage area of said wireless network, wherein at least one of said base stations comprises a radio frequency receiver controlled by a digital automatic gain control (AGC) circuit comprising:
a first shifter capable of receiving an in-phase signal as a first series of X-bit samples and left-shifting each X-bit sample by a number of bits determined by a coarse scaling factor;
a first limiter capable of receiving the D most significant bits of the output of the first shifter and outputting a subset of the D most significant bits of the first shifter output;
a first multiplier capable of multiplying the subset of the D most significant bits of the first shifter output by a fine scaling factor to produce a first M-bit product; and
a gain adjustment circuit capable of comparing a power signal derived from said first M-bit product to a maximum threshold value and generating said coarse scaling factor and said fine scaling factor.

12. The wireless network as set forth in claim 11 further comprising a first rounder for rounding said first M-bit product to a Y-bit in-phase output.

13. The wireless network as set forth in claim 11 wherein said gain adjustment circuit comprises a first squaring circuit for squaring said first M-bit product to thereby produce said power signal.

14. The wireless network as set forth in claim 13 wherein said gain adjustment circuit comprises a comparator for comparing said power signal to a maximum threshold and outputting a comparison result value, wherein said comparison result value is equal to +1 if said power signal is less than said maximum threshold, is equal to −1 if said power signal is greater than said maximum threshold, and is equal to 0 if said power signal is equal to said maximum threshold.

15. The wireless network as set forth in claim 14 wherein said gain adjustment circuit further comprises an integrator that receives said comparison result value from said comparator and generates a C-bit output.

16. The wireless network as set forth in claim 15 wherein said integrator increments said C-bit output whenever said comparison result value from said comparator is equal to +1.

17. The wireless network as set forth in claim 16 wherein said integrator decrements said C-bit output whenever said comparison result value from said comparator is equal to −1.

18. The wireless network as set forth in claim 17 wherein the N least significant bits of said C-bit output of said integrator comprise said fine scaling factor and the R most significant bits of said C-bit output of said integrator comprise said coarse scaling factor.

19. The wireless network as set forth in claim 11 further comprising:
a second shifter capable of receiving a quadrature signal as a second series of X-bit samples and left-shifting each X-bit sample by a number of bits determined by said coarse scaling factor;
a second limiter capable of receiving the D most significant bits of the output of the second shifter and outputting a subset of the D most significant bits of the second shifter output; and
a second multiplier capable of multiplying the subset of the D most significant bits of the second shifter output by said fine scaling factor to produce a second M-bit product, wherein said power signal is derived from said first and second M-bit products.

20. The wireless network as set forth in claim 19 wherein said gain adjustment circuit comprises a first squaring circuit for squaring said first M-bit product, a second squaring circuit for squaring said second M-bit product, and a summer for adding outputs of said first and second squaring circuits to thereby produce said power signal.

21. For use in a radio frequency (RF) receiver, a method of performing gain control in a digital automatic gain control (AGC) circuit comprising:
receiving in a first shifter an in-phase signal as a first series of X-bit samples and left-shifting each X-bit sample by a number of bits determined by a coarse scaling factor;
receiving in a first limiter the D most significant bits of the output of the first shifter and outputting a subset of the D most significant bits of the first shifter output;
multiplying in a first multiplier the subset of the D most significant bits of the first shifter output by a fine scaling factor to produce a first M-bit product; and
comparing a power signal derived from the first M-bit product to a maximum threshold value and generating the coarse scaling factor and the fine scaling factor.

22. The method as set forth in claim 21 further comprising the step of rounding in a first rounder the first M-bit product to a Y-bit in-phase output.

23. The method as set forth in claim 21 further comprising the step of squaring in a first squaring circuit the first M-bit product to thereby produce the power signal.

24. The method as set forth in claim 23 wherein the step of comparing comprises the sub-steps of comparing the power signal to a maximum threshold and outputting a comparison result value, wherein the comparison result value is equal to +1 if the power signal is less than the maximum threshold, is equal to −1 if the power signal is greater than the maximum threshold, and is equal to 0 if the power signal is equal to the maximum threshold.

\* \* \* \* \*